May 15, 1962 H. B. HAWKS 3,034,249
FISH LURE
Filed March 25, 1960
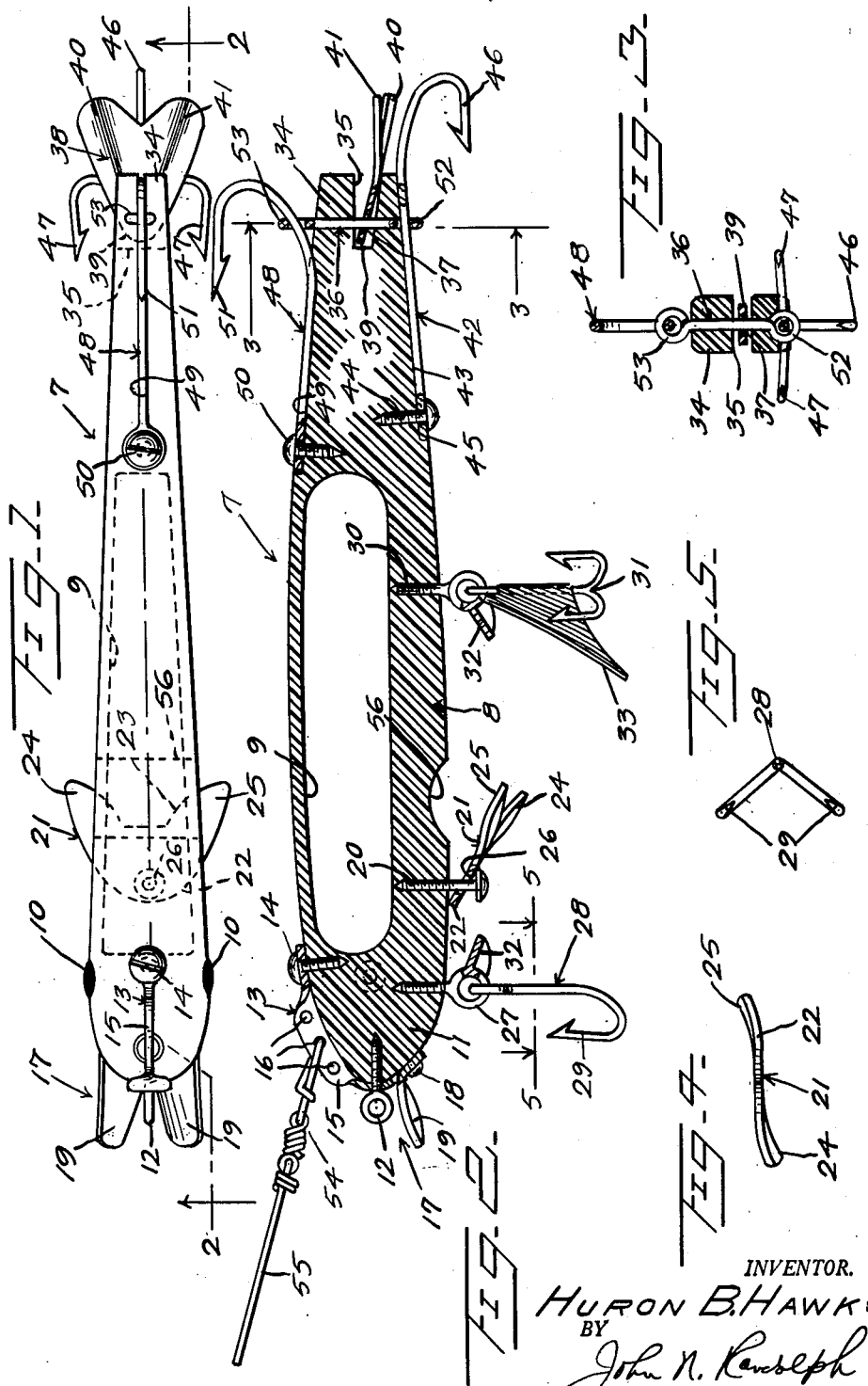
INVENTOR.
HURON B. HAWKS
BY
John N. Randolph
Atty.

3,034,249
FISH LURE
Huron B. Hawks, Hollis, Ark.
(Hollis Rte., Plainview, Ark.)
Filed Mar. 25, 1960, Ser. No. 17,662
1 Claim. (Cl. 43—42.15)

This invention relates to an artificial fish lure of the type intended to be trolled or retrieved and more particularly to a fish lure simulating a minnow and having novel features whereby both the appearance and action of a minnow will be very realistically simulated.

Most artificial baits simulating minnows and other bait fish are constructed to wobble when drawn through the water to simulate a wounded or crippled minnow or bait fish.

It is a primary object of the present invention to provide a fish lure which, in moving through the water, will very realistically simulate the normal swimming action of an uninjured minnow and which will attract certain game fish which would not strike an artificial bait simulating a crippled bait fish.

A further object of the invention is to provide a fish lure having movable parts actuated by contact with the water through which the lure is moved for simulating the movement of the fins and tail of a minnow.

Another object of the invention is to provide a fish lure having hooks arranged relative to the movable parts of the lure so that the hooks will not be readily seen by a game fish attracted to the lure.

Another object of the invention is to provide a fish lure capable of being trolled or retrieved either close to the surface or at a considerable depth.

Still another object of the invention is to provide a fish lure having a unique arrangement of hooks including at least one hook so located that a small game fish can be readily caught on the lure.

Various other objects and advantages of the invention will hereinafter become more fully apparent from the following description of the drawing, illustrating a presently preferred embodiment thereof, and wherein:

FIGURE 1 is a top plan view of the fish lure;
FIGURE 2 is a longitudinal sectional view thereof, taken substantially along the line 2—2 of FIGURE 1;
FIGURE 3 is a cross sectional view through the lure, taken substantially along a plane as indicated by the line 3—3 of FIGURE 2;
FIGURE 4 is an end elevational view, looking toward the forward end of one element of the lure, and
FIGURE 5 is a horizontal sectional view, taken substantially along a plane as indicated by the line 5—5 of FIGURE 2.

Referring more specifically to the drawing, the fish lure in its entirety is designated generally 7 and includes an elongated lure body 8 which is shaped to simulate the body of a minnow. The body 8 is preferably formed of plastic and is provided with a cavity 9 of a sufficient size to render the lure 7 buoyant. The body 8 may be of any desired color or combination of colors to simulate the coloring of a live minnow and eyes 10 are preferably painted on the body at a correct location to simulate the eyes of a minnow. The forward end of the body 8 is rounded to form the head 11 and a screw eye 12 is anchored in and projects from the forwardmost portion of the head 11 and provides an anchor for one end of a metal strip 13 which is disposed lengthwise over the upper portion of the head 11 and which is secured to said head at its opposite end by a screw 14. The intermediate portion of the strip 13 is twisted to provide an upstanding rib 15 having longitudinally spaced openings 16, for a purpose which will hereinafter be described.

A diving blade 17 has a rear end detachably secured to the underside of the head 11, beneath and adjacent the screw eye 12 by screw fastenings 18. The blade 17 has a forwardly extending portion which is notched or forked to provide corresponding wings 19 which are curved downwardly and forwardly and which are also laterally inclined downwardly and toward one another.

A headed screw 20 is anchored in the body 8 and extends downwardly therefrom and is located somewhat behind the head 11. A metal plate 21 has a convexly rounded forward edge 22 and a back edge 23 which is notched to form laterally and rearwardly extending wings 24 and 25. The plate 21 has an opening 26 located adjacent the front edge 22 and approximately midway of the ends thereof and which loosely engages the exposed portion of the shank of the screw 20, between the underside of the body 8 and the head of said screw, to mount the plate 21 loosely thereon for oscillating and rocking movement. As seen in FIGURE 2, the near wing 25 is flared upwardly relatively to the plane of the forward portion of the plate 21 and the far wing 24 is flared downwardly. The plate 21, as will hereinafter be described, simulates the pelvic or ventral fin of a minnow.

A screw eye 27 is anchored in and extends downwardly from the underside of the head 11, between and spaced from the blade 17 and screw 20, and a dual or two barbed fishhook 28 is swingably attached to the screw eye 27. The two barbs 29 of the hook 28 are laterally offset relative to one another and are forwardly offset relative to the remainder of the hook, as seen in FIGURE 5. A screw eye 30 is anchored in and extends downwardly from the underside of the body 8, behind and spaced from the fin member 21 and a treble hook 31 is swingably attached to and suspended by said screw eye 30. The eyes of the screws 27 and 30 are disposed longitudinally of the body 8 and are each provided with a guard 32. The guards 32 are inclined downwardly from the eyes of said screws toward the fin member 21 and are disposed to be engaged by portions of the hooks 28 and 31 to prevent said hooks from swinging to positions to contact the fin member 21. A member 33 is secured to and projects from the shank of the hook 31 and is constructed to simulate the anal fin of a minnow, for camouflaging the treble hook 31.

The rear end or tail portion 34 of the body 8, which is substantially narrower than the forward portion of said body, as seen in FIGURE 1, is provided with a notch 35 which is disposed substantially horizontal with respect to the body 8 and which opens outwardly of opposite sides and the rear end of the tail portion 34. A pin 36 extends vertically through the tail portion 34 and through an inner part of the notch 35 and also through an opening 37 of a plate 38 which simulates a minnow's tail. Said plate or tail member 38 is substantially heart shaped, as seen in FIGURE 1, and the opening 37 thereof is located adjacent the pointed forward end 39 of the tail member which fits loosely in the notch 35. The flared and notched rear end of the tail member projects rearwardly from the tail portion 34 and forms two wings 40 and 41. The near wing 41, as seen in FIGURE 2, is flared upwardly and the far wing 40 is flared downwardly relative to the plane of the forward portion 39 of said tail member. The pin 36 has a loose fitting engagement in the opening 37 so that the tail member 38 can oscillate freely and also rock thereon in the notch 35 and relative to the tail portion 34.

A treble hook 42 is disposed longitudinally of the underside of the rear portion of the body 8 and preferably engages a groove 43 of the body and is secured by a screw fastening 44 which is anchored in the body and extends through the eye 45 of the hook. The hook 42 extends rearwardly from the fastening 44 and has three barbs including a downwardly and forwardly turned bark 46 and laterally and forwardly extending barbs 47, as best seen in FIGURES 1 and 3. The barbs 47 are disposed in substantially the same horizontal plane and are located on opposite sides of the tail portion 34. The barb 46 is disposed behind and below the level of the barbs 47 and beneath the tail member 38. A single barbed fishhook 48 of a conventional type is disposed above the fishhook 42 and longitudinally of the body 8 and has its eye and shank seating in a longitudinal groove 49 in the upper side of the rear portion of the body 8. A headed screw fastening 50 which is anchored in the body 8 and engages the eye of the hook 48 connects the hook to the body. The barb 51 of the hook 48 is upwardly offset from the shank and is disposed above the tail portion 34. The ends of the pin 36 are looped to form eyes 52 and 53. The lower eye 52 engages around the shank of the hook 42 and the upper eye 53 engages around the hook 48 to cooperate with the headed screws 44 and 50 in anchoring the hooks 42 and 48 immovably to the under side and upper side, respectively, of the body 8.

A conventional swivel snap or similar fastening 54 is secured to an end of a fishing line or leader 55 and is selectively engageable with the eye of the screw 12 or one of the openings 16, for attaching the lure 7 to the fishing line or leader, as seen in FIGURE 2. The lure 7 is drawn through the water from right to left, as seen in FIGURE 1 and 2, and when so moved the hooks 28 and 31 will swing upwardly and rearwardly. The fin member 21 will also swing upwardly to a position so that the flat forward part thereof is disposed against the underside of the body 8. In this position, the fin member 21 will oscillate transversely on the shank of the fastening 20 and will also rock or wobble relative to said fastening due to the water, through which the lure 7 is moving, impinging against the underside of the wing 24 and the upper side of the wing 25, to simulate the movement of the pelvic or ventral fin of a live minnow. As seen in FIGURES 1 and 2, the underside of the body 8 is provided with a recess 56 extending from side-to-side thereof to accommodate the wings 24 and 25 and to prevent said wings from striking the body as the fin member 21 wobbles and swings relative to the body 8. The hook 28 will assume a position close to but out of contact with the moving fin member 21 so that it will not be readily noticed due to the movement of the fin. Likewise, the hook 31 will be disposed in close proximity to the underside of the body 8 behind the fastening 30 and will be substantially concealed and camouflaged by the fin member 33 which will then be inclined downwardly and rearwardly, similar to the anal fin of a minnow. The tail member 38 will swing and rock in the same manner as the fin 21 to simulate the movement of the tail of a minnow and to attract attention from the hook barbs 46, 47 and 51, located adjacent thereto.

Due to the location of the cavity 9 in the upper part of the body 8 and the fact that the preponderance of weight of the lure 7 is disposed below the center of gravity of the body 8, the lure 7 will not wobble as it is drawn through the water and will thus realistically simulate the natural swimming movement of an uninjured minnow so that game fish will not be wary of attacking the lure 7 due to fear that it has been crippled by a larger game fish which is lurking nearby and using a crippled minnow as a bait.

The hooks of the lure 7 are strategically located so that a game fish in striking substantially any part of the body of the lure will be caught on one of the hooks. The hook barb 46 is disposed beyond the tail portion 34 and in close proximity to the animated tail member 38 so that small game fish, which usually strike the tail of a lure or swimming live bait and which cannot be caught on the hooks of a conventional artificial bait, will be readily caught on the barbed hook portion 46.

The diving blade 17 will cause the lure to move below the surface when being trolled or retrieved and the depth of the lure will be increased by attaching the swivel snap 54 to one of the openings 16 rather than the screw eye 12. The water impinging against the upper faces of the wings 19 of the diving blade 17 will, in addition to exerting forces tending to deflect the forward end of the lure 7 downwardly, also resist rocking or wobbling of the lure, as is frequently caused by conventional blades utilized to cause a fish lure to dive or descend when drawn through the water. The lure 7 can be operated as a surface lure by removing the diving blade 17 and attaching the snap 54 to the screw eye 12.

The size and location of the cavity 9 can be varied and is preferably so located and of such a size that the preponderance of the weight of the lure 7 will be toward the tail portion 34 to cause the lure body 8 to be inclined downwardly and rearwardly similar to the position normally assumed by a swimming minnow, especially when the minnow is swimming at or adjacent the surface of the water.

The lure 7 has been illustrated in the drawing, for the purpose of clarity, substantially larger than the normal size of the lure; however, it will be understood that the lure may be made in various sizes.

Various modifications and changes are contemplated and may be resorted to, without departing from the function or scope of the invention as hereinafter defined by the appended claim.

I claim as my invention:

A fish lure comprising an elongated lure body including an underside and a tail portion, an animated tail member, means loosely attaching said tail member to the tail portion, an animated fin member, means loosely attaching the fin member to the underside of the body, said fin member and tail member each having oppositely pitched portions constituting a free end thereof, said pitched portions being spaced from the attaching means thereof and responsive to fluid pressure for causing the tail member and fin member to oscillate and wobble relative to the lure body, said underside of the lure body having an exposed recess extending from side-to-side thereof and arcuately curved longitudinally of the body for accommodating the pitched portions of the fin member during oscillating and wobbling movement of the fin member.

References Cited in the file of this patent
UNITED STATES PATENTS

| | | |
|---|---|---|
| 849,522 | Adams | Apr. 9, 1907 |
| 1,237,529 | Kuroki | Aug. 21, 1917 |
| 1,622,063 | Steenstrup | Mar. 22, 1927 |
| 1,707,407 | Miles | Apr. 2, 1929 |
| 1,828,574 | Neukam | Oct. 20, 1931 |
| 2,005,985 | Bear | June 25, 1935 |
| 2,150,846 | Rayburn | Mar. 14, 1939 |
| 2,283,960 | Wade | May 26, 1942 |
| 2,570,338 | Gambill | Oct. 9, 1951 |
| 2,597,792 | Hardy | May 20, 1952 |
| 2,600,437 | Siepe | June 17, 1952 |
| 2,674,060 | Simmons | Apr. 6, 1954 |